Patented Dec. 29, 1931

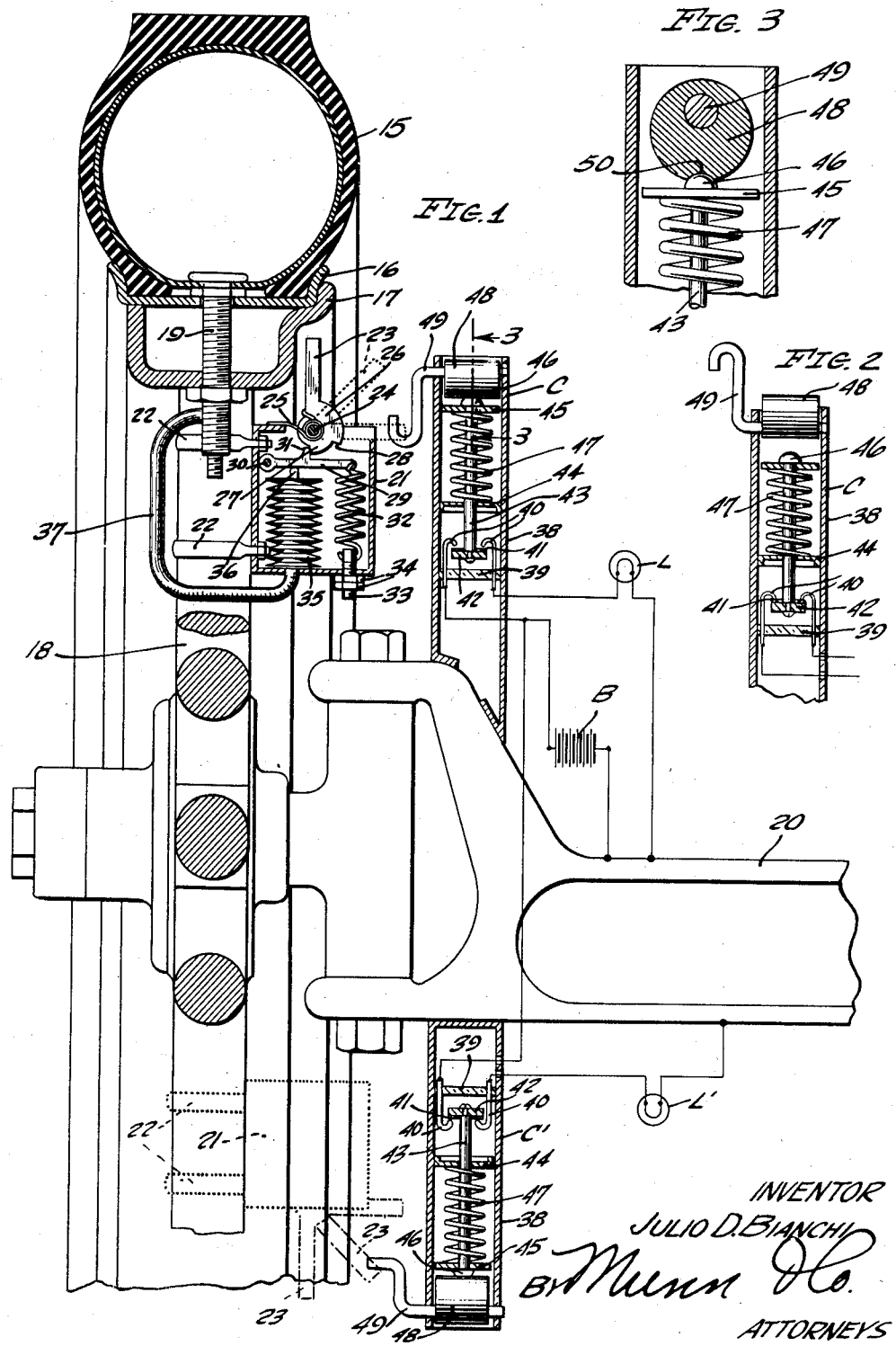

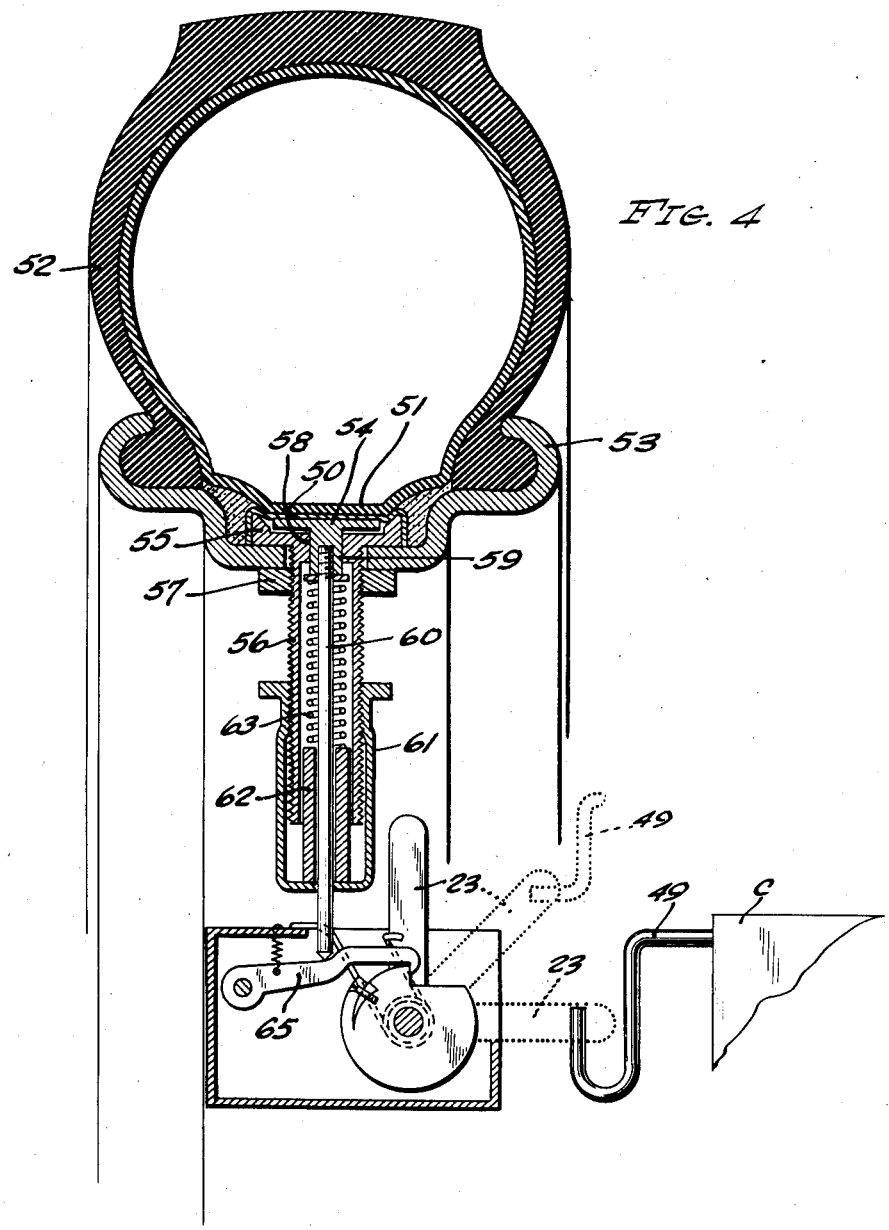

1,838,295

UNITED STATES PATENT OFFICE

JULIO D. BIANCHI, OF VENTURA, CALIFORNIA

SIGNALING DEVICE FOR PNEUMATIC TIRES

Application filed October 29, 1928. Serial No. 315,856.

My invention relates to and has for a purpose the provision of a device adaptable to pneumatic tires for vehicles, which is operable automatically to visibly or otherwise indicate to the operator of the vehicle when any one or all of the tires become underinflated, in order that the operator may take the necessary steps to reinflate the tires and thus prevent injury thereto.

It is also a purpose of my invention to provide a signaling device for pneumatic tires which is characterized by being operable automatically to give two indications to the operator of the vehicle, one when the tire is slightly underinflated, and the other when the tire reaches a much greater degree of underinflation as to require immediate reinflation to prevent serious and permanent injury to the tire.

I will describe only two forms of signaling devices embodying my invention and will then point out the novel features in claims.

In the accompanying drawings:

Figure 1 is a view showing in vertical section, and partly in elevation, one form of signaling device embodying my invention in applied position to one front wheel and the axle of a motor vehicle, the wheel being shown in section;

Fig. 2 is a view showing in vertical section one of the circuit controllers shown in Fig. 1 but in closed position as distinguished from the open position shown in Fig. 1;

Fig. 3 is a fragmentary sectional view taken on the line 3—3 of Fig. 1; and

Fig. 4 is a view similar to Fig. 1 showing another form of signaling device embodying my invention.

Similar reference characters refer to similar parts in each of the several views.

My invention in the embodiment illustrated in Fig. 1 is shown applied to one of the front wheels of a motor vehicle and the adjacent axle, although it will be understood that in actual practice each wheel of the vehicle is provided with a signaling device, with the signals thereof positioned preferably upon the instrument board of the vehicle in order that they may be readily observed by the operator of the vehicle.

In Fig. 1 is disclosed a conventional form of vehicle wheel including a pneumatic tire 15 mounted upon the usual rim 16 with the latter secured to the felly 17 of the wheel 18. The tire is provided with the usual valve stem 19 which extends inwardly through the rim and felly as is conventional. The wheel as a whole is mounted for steering movement upon the front vehicle axle 20.

The signaling device comprising my invention includes a casing 21 secured to one of the spokes of the wheel 18 by means of brackets 22 and so that the casing and the parts of the mechanism carried thereby will be rotatable with the wheel. A detent 23 is pivoted as indicated at 24 on the casing 21, and by means of a spring 25 the detent is yieldably urged to the horizontal position shown in dotted lines in Fig. 1, this position being defined by the upper end of the casing which functions as a stop for the detent. The detent is provided with a head 26 constructed to form shoulders 27 and 28 spaced circumferentially from each other and disposed different distances from the axis 24. A latch lever 29 is pivoted at the point indicated at 30 and is provided with a lug 31 which is adapted to engage the shoulders 27 and 28 for maintaining the detent in two positions of adjustment, one of which is shown in solid lines in Fig. 1, and the other in dash lines. This lever 29 is urged to a released position with respect to the shoulders 27 and 28 by means of a spring 32 disposed within the casing 21 and having its lower end connected to an eye bolt 33 threaded in the casing and provided with nuts 34 by which it can be adjusted and locked in adjusted position. It will be understood that by adjustment of the bolt 33 the tension of the spring 32 can be increased or decreased as desired.

The lever 29 is adapted to be maintained in a latching position with respect to the detent 23 by means of a member 35 capable of being expanded by fluid pressure to exert an upward force on the lever 29 through a pin 36. This member 35, in the present instance, is constructed of a plurality of diaphragms connected to each other in the manner of an accordion, in order that they may respond to internal fluid pressure in a manner to increase the overall length of the member as the pressure is increased, and conversely, to decrease the overall length of the member as the pressure is decreased. This member is actuated by air pressure from the tire 15, which is conveyed to the member through a tube 37 tapped into the valve stem 19 at a point below the valve in order that the pressure of the tire will at all times be conveyed to the member 35.

Fixed to the axle 20 in any suitable manner are two circuit controllers C and C' adapted to control the flow of current from a battery B to signal lamps L and L', respectively. These lamps may be positioned upon the instrument board of the motor vehicle in order that they may be readily observed by the operator of the vehicle, and, it will be understood, to simplify the drawings the lamps and their connections have been illustrated diagrammatically.

As the circuit controllers C and C' are identical in construction with the single exception of the trip arms, a description of one will suffice for both.

The circuit controller C comprises a tubular casing 38 suitably secured to the axle 20, preferably at the top side thereof, and within which is a partition 39 of insulating material. Extending through this partition are a pair of stationary contacts 40 which constitute the terminals of the circuit for the lamp L including, of course, the battery B. A ring-shaped contact 41 is secured to a disk 42 of insulating material, the latter in turn being secured to a rod 43 constituting part of a plunger and movable through a partition 44. The head 45 of the plunger is secured to the opposite end of the rod 43 by means of a screw 46, a coiled expansible spring 47 being interposed between the head 45 and the partition 44 for yieldably urging the plunger upwardly within the casing so as to cause the contact 41 to bridge the terminal contacts 40 and thus close the circuit for the lamp L.

The plunger is adapted to be normally maintained in a depressed position in which the contact 41 is out of engagement with the contacts 40 so that the circuit of the lamp L is normally open. To this end I provide a trip device comprising a cam 48 journaled in the upper end of the casing 38 and rotatable by a trip arm 49 to occupy depressing and non-depressing positions with respect to the plunger. In the depressing position of the cam the head of the screw 46 is seated within a suitable notch 50 of the cam in order to prevent accidental rotation of the cam with consequent release of the plunger.

The trip arm 49 of the circuit controller C is of J-form in order that when in normal position it will be engaged and actuated by the detent 23 only when the latter is in the horizontal dotted line position shown in Fig. 1. The trip arm 49$^a$ of the circuit controller C is of substantially L-form, and in its normal position will be engaged by the detent 23 only when the latter is in the inclined dash line position shown in Fig. 1. As the two circuit controllers are adapted to be operated separately, they are spaced circumferentially with respect to the axis of the wheel 18, and in the present instance I have shown them disposed at opposite sides of the axle 20 although it will be understood that other arrangements and mountings may be resorted to. Likewise, in practice, the circuit controller C is normally open so that the lamp L' is normally extinguished and adapted to be illuminated only when the circuit controller C' is closed.

The operation of the signaling device is as follows: Initially, the trip arms 49 and 49$^a$, and the detent 23 are adapted to be manually moved to the solid line position shown and so that the circuit controllers C and C' are open and the lamps L and L' extinguished. The detent 23 is maintained in the upright position shown by the engagement of the lug 31 with the shoulder 27, the lever 29 being maintained in latching position against the action of the spring 32 by a pressure of air within the member 35 that corresponds to the proper pressure for fully inflating the tire 15. As a consequence, the detent will be maintained in this upright position, as long as the tire 15 is properly inflated. Of course, it will be understood that the detent 23 is rotatable with the wheel 18 but when latched in the upright position it is ineffective to engage the trip arms 49 and 49$^a$ so that the circuit controllers remain open.

However, when the pressure of air in the tire 15, for any reason, is slightly reduced below this proper pressure so as to produce a condition of slight underinflation the member 35, by reason of this reduction in pressure, slightly contracts longitudinally permitting the spring 32 to actuate the lever 29 to the extent of moving the lug 31 just clear of the shoulder 27. As a consequence, the spring 25 now acts to rotate the detent 23 until the shoulder 29 engages the lugs 31 thus maintaining the detent in the inclined dotted line position. With the wheel 18 rotating, it will be clear that the detent 23 now describes a circular path in which the trip arm 49$^a$ is disposed. As a consequence the detent strikes the trip arm and thus rotates the cam 48$^a$ to a position in which the plunger is free to move the contact 41$^a$ into engagement with the contacts 40$^a$. Thus, the circuit for the lamp L' is closed and the lamp illuminated. Such illumination indicates to the operator of the vehicle that this particular tire is slightly underinflated.

Should the tire 15 become further underinflated or deflated, the member 35 will further contract, allowing the lug 31 of the latch lever to move clear of the shoulder 28. This allows the spring 25 to move the detent 23 to the horizontal position in which it describes a different circular path from that described in its former position, and a path in which the trip arm 49 is disposed. As a consequence, the detent now strikes the trip arm 49 rotating the cam 48 to permit the plunger to move the contact 41 into bridging relation with the contacts 40. Thus the circuit for the lamp L is now closed and the lamp illuminated so as to indicate to the operator of the vehicle this new and dangerous condition of the tire.

Referring now to Fig. 4, I have here shown another form of signaling device embodying my invention and which is particularly designed, although not necessarily, for use on vehicle wheels having non-demountable rims. Further, the signaling device is independent of the tire valve stem as distinguished from the form of device shown in Fig. 1.

As shown in Fig. 4, the device comprises a flexible diaphragm 50, one face of which bears against a portion of the inner periphery of the inner tube 51, the latter being contained within the usual casing 52 and the two mounted on the demountable rim 53. The opposite face of the diaphragm 50 bears against a plunger head 54 movable in a frame head 55 of cup form and disposed between the inner tube and rim. A tubular frame stem 56 on the end of which is formed the frame head 55 projects from the rim 53 through a suitable opening, and the head and stem are fixedly secured to the rim by a lock nut 57 on the stem and engaging the rim. Adjacent the head 55, the stem 56 is interiorly reduced in diameter to provide a centering guide 58 for an extension 59 of the plunger head 54. The extension in turn is threadedly connected to a plunger rod 60 in such manner as to allow longitudinal adjustment of the plunger rod and thus increase or decrease its length to suit individual wheels.

The outer end of the stem 56 is closed by a cap 61 threaded thereon and forming an abutment for a sleeve 62 movable in and projecting from the stem 56. A coiled expansible spring 63 is interposed between the extension 59 and the sleeve 62 to urge the plunger inwardly so that the head 54 is maintained in contact with the diaphragm 50 and the sleeve 62 in contact with the cap 61. Thus, by an adjustment of the cap 61 on the stem, the tension of the spring 63 may be regulated to vary the pressure of the plunger head against the diaphragm. The diaphragm is secured in position by extending its marginal edge between the frame head 54 and a filler ring 64 surrounding the head. It is important to note that the construction of the head 54 and the filler ring is such as not to present any sharp corners or edges to the inner tube.

The outer end of the plunger rod projects through and from the cap 61 so that its free end may rest on a latch lever 65. This lever corresponds to the lever 29 in the first form of signaling device to control release of the detent 23.

In operation, the pressure of air in the inner tube operates through the diaphragm to move the plunger head against the tension of the spring to project the plunger rod a distance predetermined by the pressure of air in the tube and the tension of the spring. Thus, with the tube properly inflated, the rod maintains the latch lever in latched position with respect to the detent to hold the latter in the solid line position shown in Fig. 4. However, as pressure in the tube decreases the plunger rod moves to release the detent and thus actuate one circuit controller C and C' or the other in the same manner as the lever 29.

Although I have herein shown and described only two forms of signalling devices each embodying my invention, it is to be understood that various changes and modifications may be made herein without departing from the spirit of the invention and the spirit and scope of the appended claims.

I claim:

1. In a signaling device for pneumatic tires, a detent means for mounting the detent on a wheel for pivotal movement to successively occupy three different and definite positions in each of which it is adapted to describe a different circular path during rotation of the wheel, means for urging the detent to the last of said positions, and fluid pressure controlled means for restraining the detent against movement under the action of said urging means and for releasing the detent so that it successively occupies the three different positions in accordance with a predetermined reduction of fluid pressure.

2. In a signaling device for pneumatic tires, a wheel carried detent movable to occupy different positions for describing different circular paths under rotation of the wheel, and means responsive to reductions in pressure of air in the tire of the wheel for determining the position occupied by and hence the circular path described by the detent, said means comprising a head on the detent having shoulders spaced different distances radially from the center of the head, a latch lever urged to a released position with respect to the head, and a fluid pressure operated member for maintaining the latch lever in engagement with that shoulder nearest the center of the head when the member is subjected to fluid of a predetermined pressure and for releasing the lever as the pressure decreases to successively engage the remaining shoulders whereby the detent is caused to successively occupy its different positions.

3. In a signaling device for pneumatic tires, a wheel carried detent movable to occupy different positions for describing different circular paths under rotation of the wheel, means responsive to reductions in pressure of air in the tire of the wheel for determining the position occupied by and hence the circular path described by the detent said means comprising a diaphragm adapted to have contact with a tire tube, a plunger having a head bearing against the diagram and a spring pressed rod for urging the head into contact with the diaphragm, a head on the detent, and a latch lever movable by said rod to engage or disengage said head and to thereby control the position of the detent.

Signed at Ventura in the county of Ventura and State of California this 19th day of October, A. D. 1928.

JULIO D. BIANCHI.